Sept. 16, 1930.  I. WAGNER  1,776,208

COUPLING

Filed Dec. 20, 1929

WITNESSE
C.B. Shillinger

INVENTOR
Iv Wagner
BY
ATTORNEYS

Patented Sept. 16, 1930

1,776,208

UNITED STATES PATENT OFFICE

IV WAGNER, OF LOUISIANA, MISSOURI

COUPLING

Application filed December 20, 1929. Serial No. 415,565.

My invention relates to couplings, and more particularly to couplings for rail joints, and it consists in the combinations, arrangements and constructions herein described and claimed.

As is well known to those familiar with railroad operation, the joints between rails often become loose due to vibrations caused by passing trains, etc., thereby subjecting the passengers and crews of said trains and others to possible loss of life and serious injury. It is, therefore, a primary object of my invention to provide a coupling for use on railroads that will not become loosened by vibrational and other forces exerted on said coupling and that will maintain said rail joint in tight fixed position.

A further object of my invention is to provide a device of the type described which, though maintained in close fixed relation relative to the rails when fastened thereto, may nevertheless be removed by a simple operation.

Another object of my invention is to provide a device of the type described which is adapted for use with the conventional forms of fasteners, such as nuts and bolts, in ordinary use on railroads.

A still further object of my invention is to provide a device of the type described which is simple in construction, has few parts, and does not get out of order easily.

Other objects and advantages will appear as the specification proceeds and the invention will be more particularly defined in the appended claims.

My device is illustrated in the accompanying drawings forming part of this specification, in which:—

Figure 1:
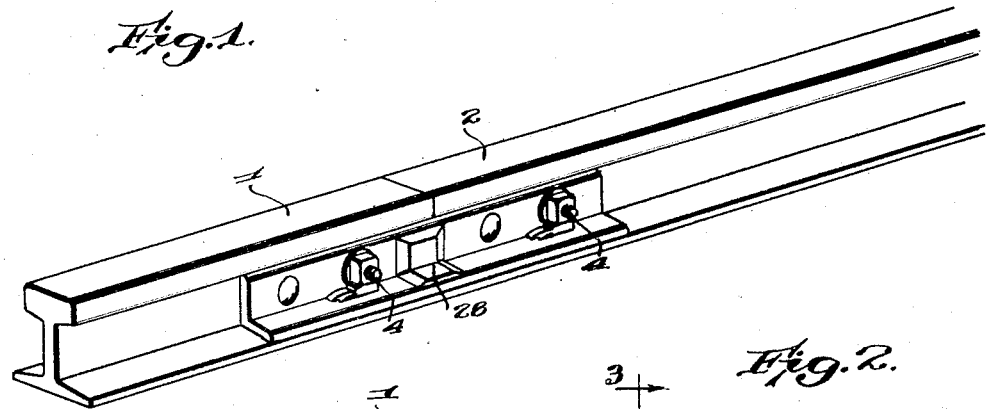
Figure 1 is a perspective view of my device in use on a rail joint.
Figure 2:
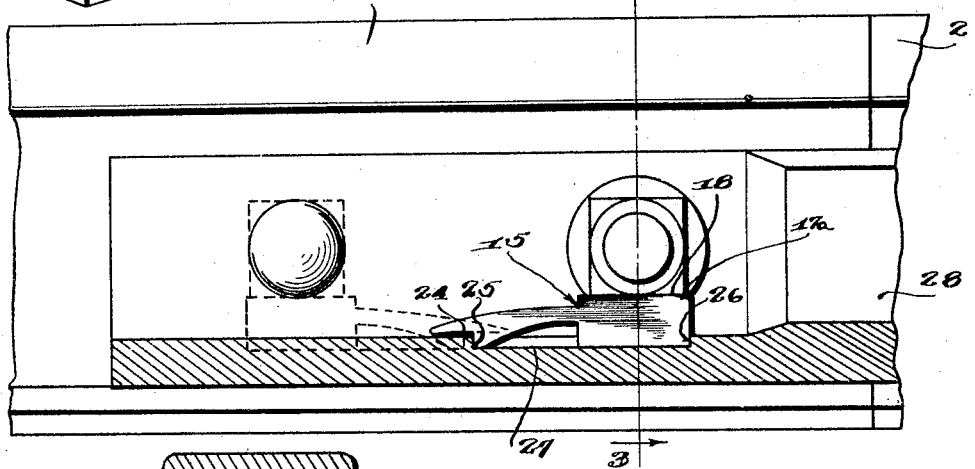
Fig. 2 is a sectional detail view of a portion of the device.
Figure 3:
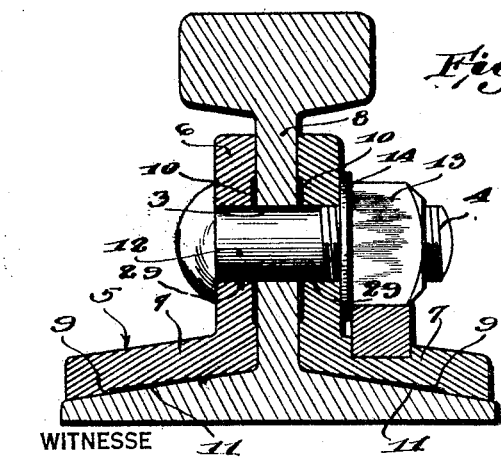
Fig. 3 is a sectional view on line 3—3 of Fig. 2.
Figure 4:
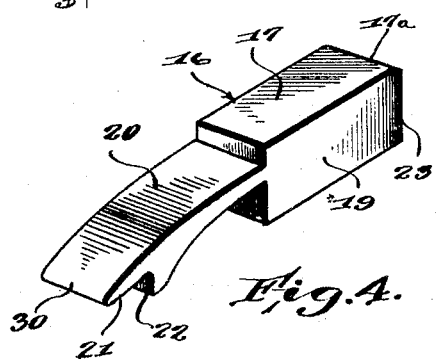
Fig. 4 is a perspective detail view of a portion of the device.

In carrying out my invention, I make use of the abutting rail members 1 and 2 which it is desired to secure in coupled relation. These rails, as in ordinary constructions, are provided with apertures 3 adapted to receive bolt members 4 engageable therethrough. For securing the rails in abutting end relation, I provide the similarly shaped and oppositely disposed plates 5 having the vertically extending walls 6 and the horizontally extending walls 7 adapted to engage the correspondingly disposed walls 8 and 9 of the rail members. As appears from an examination of Fig. 3, these plates 5 have the hollowed out portions 10 in their vertically extending walls and the hollowed out portions 11 in their horizontally extending walls, thereby permitting said plates 5 to be "sprung" into close relation with the walls of the rail, and as is shown in Figs. 1 and 2, these plates are provided with an enlarged portion 28 adjacent the abutting ends of the rails 1 and 2 for adding strength thereto. Rectilinear slots 27 are formed in the longitudinal walls of these plates adjacent each of the apertures 29 therein which are adapted to be positioned in alignment with the apertures 3, all for a purpose soon to appear.

For securing the plates 5 to said rails, the usual bolt and nut means 12 comprising the bolts 4 and the nuts 13 are provided. These bolts may mount the washers 14 between the nuts 13 and the engaging walls of the plates 5 adjacent thereto, if desired. As in usual constructions, the nut 13 is of polygonal shape.

For securing the nuts 13 on their bolts 4 against the tendency to loosen caused by the vibrational forces to which said fastening means are subjected, I provide the nut lock means generally indicated at 15. Each of these nut lock means comprises the movable member 16 constructed of any suitable resilient material such as spring steel and having the plane horizontal surface 17 adapted to engage one of the side walls 18 of nut 13 and provided with the tapered surface 17ª for facilitating the insertion of the lock under the nut. The body portion 19 of this movable member 16 extends downwardly preferably in rectilinear formation. Extending from one end of this body portion 19 is the flexible arm 20 having the horizontally and vertically extending shoulder portions 21 and 22. As appears in Figs. 1 to 3, this movable member 16 is secured against movement by means of the engagement of shoulders 21 and 22 and wall 23 thereon with walls 24, 25 and 26, respectively, formed by the portions of the plate 5 adjacent to and within the rectilinear slot or depression 27 formed in said plates 5. In this preferred embodiment, the nuts 13 are shown as having four sides. It is obvious, however, that my invention would be operable and applicable if a polygonal nut of any suitable nature were used.

From the foregoing description, the use and operation of my device are easily understood. The plates 5 are positioned on the rails, as appears in Figs. 1 and 3, with the apertures 29 therein adjacent the apertures 3 formed in said rail. The bolts 4 are then placed in said alined apertures and the nuts 13 with washers 14, if desired, engaged with said bolts. When the nuts 13 have been secured upon the bolts and as firmly mounted as desired, the movable member 16 of each nut lock is inserted beneath the lowermost and horizontal wall of its engaging nut, as appears most clearly in Fig. 2. It is then slid horizontally into engagement with said wall until the shoulders 21 and 22 and the wall 23 thereon engage the walls 24, 25 and 26 formed in the plates 5. This operation is easily permitted by the resilient arm 20, which forcibly snaps into this engagement when slid to the proper position. The movable member 16 is then securely mounted in position within its engaging slot, as appears in Fig. 2, the resilient arm 20 maintaining said member in this position.

When it is desired to remove the coupling from the rails, the arm 20 is raised against its resilient force by engaging the foremost end 30 thereof with a tool or by means of any suitable nature adapted to pry said arm 20 upwardly relative to the plates 5. When in this raised position, the movable member 16 can easily be slid horizontally out of engagement with the nut 13 when the nuts can be disconnected from the bolts and the coupling plates 5 thus released.

It is thus seen that I have provided a coupling means particularly adapted for use on railroads which will not loosen or get out of order because of vibrational or other forces exerted thereon and which is adapted for easy engagement and disengagement with the rails.

I claim:—

1. A coupling means for rail members and the like comprising a pair of similarly formed and oppositely disposed plates, fastening means engageable through said plates and having polygonal nuts, and nut locks for securing said nuts against movement, said nut locks being adapted to be slid into engagement with said nuts and to be sprung into locking engagement with said plates.

2. In a coupling for rail members and the like, a pair of similarly formed and oppositely disposed plates for engagement with said rail members having rectilinearly formed slots therein, fastening means for securing said plates to said rail having polygonal nuts, and nut lock members adapted to be positioned in said slots to engage one of the walls of said nuts and having walls adapted to be sprung into engagement with a wall of said slot and the surface of said plate adjacent said slot wall.

3. In a coupling for rail members and the like, a pair of similarly formed, oppositely disposed plate members, apertures formed in said plate members for the reception of bolts, rectangular slots formed in said plates below said apertures, bolts positioned in said apertures, polygonal nuts engageable with said bolts, and nut lock members for securing said nuts against movement having body portions providing walls adapted to engage a wall of said nuts and a wall of said slots, and a flexible arm extending from each of said body portions and having walls adapted to engage another wall of said slots and the surface of said plates adjacent to said slots.

4. In a coupling for rail members and the like, a pair of similarly formed, oppositely disposed plates having vertically and horizontally extending walls presenting hollowed out surfaces for engagement with said rail member and having apertures in said vertical walls and rectangularly formed slots in said horizontal walls below said apertures, bolts engageable through said apertures, polygonal nuts mounted on the ends of said bolts, and a nut lock member for securing each of said nuts against movement comprising a body portion of rectilinear form having a horizontal wall adapted to engage one of the walls of each of said polygonal nuts and a vertical wall adapted to engage a wall of its cooperating rectangular slot and a flexible member integral with said body portion extending laterally therefrom and having a vertical shoulder adapted to engage a vertical wall of said slot and a horizontal shoulder adapted to engage the surface of said plate adjacent said slot.

5. In a coupling member or the like, similarly formed and oppositely disposed plates for engagement with the rail members having alined apertures and slots for the reception of nut and bolt fastening means in said apertures and nut locks in said slots, bolts and associated polygonal nuts engageable through said apertures, nut locks in said slots for engagement with said nuts, said nut locks having body portions adapted for engagement with the walls of said nuts when positioned in said slots and locking portions extending from said body portions adapted to be sprung into locking engagement with portions of said slots.

6. In a coupling for rail members and the like, plates for engaging said rail members having alined apertures and slots, bolt and nut fastening means extending through said apertures, and nut locks adapted for engagement with the walls of said nuts when positioned in said slots and for resilient locking engagement with portions of said slot.

7. In a coupling for rail members or the like, a pair of similarly formed, oppositely disposed plates having apertures and slots, bolt and polygonal nut fastening means engageable through said apertures for securing said plates in position and nut locks adapted for positioning in said slots to engage the walls of said nuts, said nut locks having means for engaging walls of said slot and to project over the edges of said slots to engage portions of said plates adjacent said slots.

IV WAGNER.